United States Patent [19]
Ebe

[11] Patent Number: 5,915,141
[45] Date of Patent: Jun. 22, 1999

[54] SHUTTER DEVICE HAVING ECCENTRIC PIN FOR ADJUSTING URGING FORCE

[75] Inventor: Akihiko Ebe, Yokohama, Japan

[73] Assignee: Canon Kabushiki Kaisha, Tokyo, Japan

[21] Appl. No.: 08/991,824

[22] Filed: Dec. 17, 1997

[30] Foreign Application Priority Data

Dec. 27, 1996 [JP] Japan .................................. 8-350424

[51] Int. Cl.⁶ ...................................................... G03B 9/14
[52] U.S. Cl. .......................................... 396/470; 396/493
[58] Field of Search ..................................... 396/452, 463, 396/470, 483, 484, 490, 493, 497, 501, 449

[56] References Cited

U.S. PATENT DOCUMENTS

4,264,170  4/1981  Kurei .
4,342,506  8/1982  Johnson et al. .

Primary Examiner—Eddie C. Lee
Assistant Examiner—J. K. Han
Attorney, Agent, or Firm—Robin, Blecker & Daley

[57] ABSTRACT

A shutter device includes a base member, a plurality of shutter blades supported by the base member and each arranged to turn in opposite directions, a shutter blade driving lever having an engaging part which engages the plurality of shutter blades and arranged to turn so as to cause each of the plurality of shutter blades to turn in the opposite directions, an eccentric pin which is rotatable, and a spring having one end thereof connected to the shutter blade driving lever and the other end thereof connected to the eccentric pin, and arranged to drive the plurality of shutter blades by urging the shutter blade driving lever in one direction, wherein an urging force of the spring is adjustable by rotating the eccentric pin.

23 Claims, 9 Drawing Sheets

SHUTTER DEVICE HAVING ECCENTRIC PIN FOR ADJUSTING URGING FORCE

BACKGROUND OF THE INVENTION

1. Field of the Invention

The present invention relates to a shutter of electromagnetic actuator driving type for cameras.

2. Description of Related Art

In a conventional shutter of electromagnetic actuator driving type for cameras, in cases where the opening speed of the shutter blades thereof is required to be mechanically changed, it has been practiced to vary a spring force either by selecting one of various springs which have different spring forces or by changing a hooking position of a torsion spring.

Also, in the case of a camera shutter of the kind having the shutter blades arranged to be opened directly by an electromagnetic actuator and closed by a restoring force of a spring, as disclosed in Japanese Laid-Open Utility Model Application No. HEI 5-59435, the spring is a torsion spring and the restoring force of the torsion spring is arranged to be adjustable by rotating a mount part on which the base of the torsion spring is mounted.

However, in the first-mentioned conventional example, since the opening speed of the shutter blades is adjusted by selecting one of springs of different spring forces or, with a torsion spring having an unstable spring force used for the shutter, by varying the hooked position of the torsion spring, such an arrangement hardly permits fine adjustment, because the selection of the spring force for adjustment of the shutter-blade opening speed is made from among spring forces which are set not continuously but stepwise. The shutter-blade opening speed thus cannot be accurately adjusted Further, as for the second-mentioned device disclosed in Japanese Laid-Open Utility Model Application No. HEI 5-59435, the device is for adjustment of the shutter-blade closing speed of a camera shutter and not for the shutter-blade opening speed. Also, since a torsion spring is used as a shutter-blade closing spring and the shutter-blade closing speed is adjusted by rotating (turning) the base mounting part of the torsion spring in such a way as to adjust the restoring force of the torsion spring, it is, however, difficult to linearly adjust the restoring force of the torsion spring by such an arrangement. In addition, another problem arises in that, since the torsion spring is arranged to be hooked directly on a hole provided in a shutter blade, such a spring hooking arrangement, however, tends to damage the hole provided in the shutter blade.

BRIEF SUMMARY OF THE INVENTION

In accordance with one aspect of the invention, there is provided a shutter device which comprises a base member, a plurality of shutter blades supported by the base member and each arranged to turn in opposite directions, a shutter blade driving lever having an engaging part which engages the plurality of shutter blades and arranged to turn so as to cause each of the plurality of shutter blades to turn in the opposite directions, an eccentric pin which is rotatable, and a spring having one end thereof connected to the shutter blade driving lever and the other end thereof connected to the eccentric pin, and arranged to drive the plurality of shutter blades by urging the shutter blade driving lever in one direction, wherein an urging force of the spring is adjustable by rotating the eccentric pin, so that a spring force for driving the plurality of shutter blades can be easily adjusted.

The above and other aspects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

First Embodiment

Figure 1:
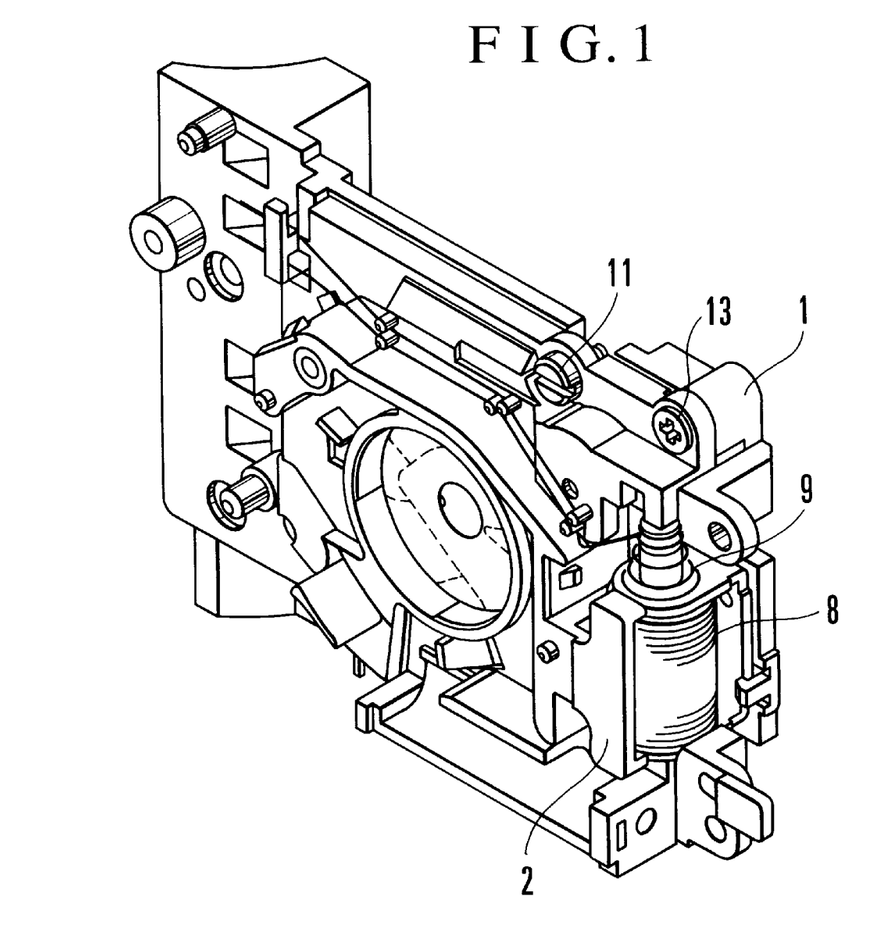
FIG. 1 is a perspective view showing a camera shutter arranged as a first embodiment of the invention.
Figure 2:
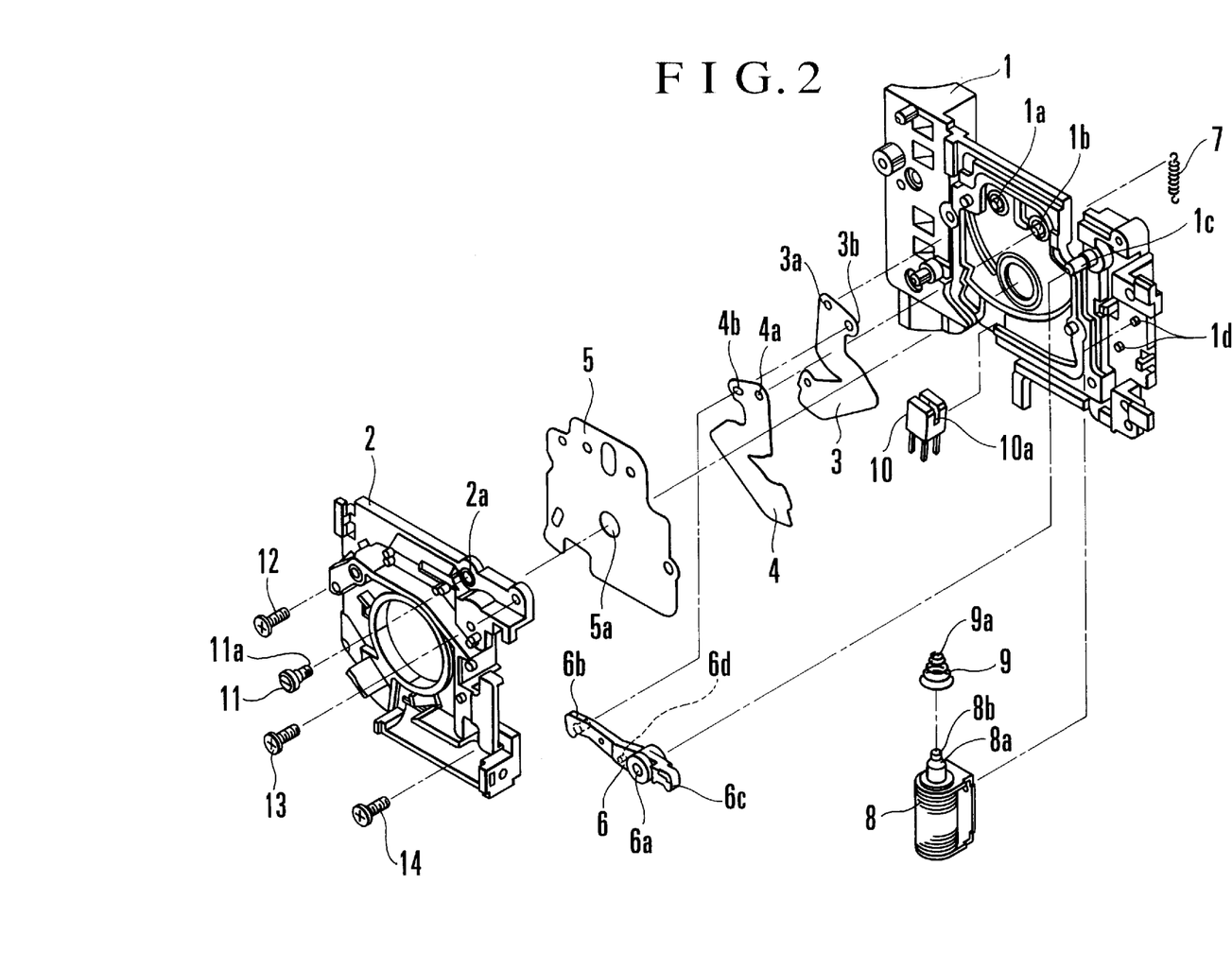
FIG. 2 is an exploded perspective view showing the arrangement of the camera shutter shown in FIG. 1.

FIG. 1 shows in a perspective view a shutter for cameras arranged as a first embodiment of the invention. FIG. 2 shows the shutter in an exploded perspective view.

Referring to FIGS. 1 and 2, there are illustrated a shutter base plate 1, a blade retaining base plate 2, shutter blades 3 and 4, a light blocking plate 5 having an aperture 5a formed therein, a blade driving lever 6, a tension coil spring 7, a plunger 8, a plunger return spring 9, a photo-interrupter 10, and a hook attaching shaft 11 for the tension coil spring 7. A hook attaching part 11a which is in a shaft-like shape for attaching an upper hook of the tension coil spring 7 thereto is formed at the fore end of the hook attaching shaft 11 in an eccentric state with respect to the axis of the hook attaching shaft 11. Screws 12, 13 and 14 are arranged to fix the blade retaining base plate 2 in place.

The shutter blade 3 has a hole part 3a thereof fitted on a shaft part 1a of the shutter base plate 1 and is mounted on the shutter base plate 1 in such a way as to be able to turn on the shaft part 1a. The other shutter blade 4 likewise has a hole part 4a thereof fitted on another shaft part 1b of the shutter base plate 1 and is thus mounted on the shutter base plate 1 in such a way as to be able to turn on the shaft part 1b. The photo-interrupter 10 is also mounted on the shutter base plate 1, in such a way as to have the shutter blades 3 and 4 movable inside of a detecting part 10a of the photo-interrupter 10. The photo-interrupter 10 is arranged to detect the movement of the shutter blades 3 and 4 for control over a coil energizing time for the plunger 8. The light blocking plate 5 having the shutter aperture 5a formed therein is mounted on the shutter base plate 1.

The blade driving lever 6 has a hole part 6a thereof fitted on a shaft part 1c of the shutter base plate 1, while a driving shaft 6b of the blade driving lever 6 is fitted into both of a slot 3b of the shutter blade 3 and a slot 4b of the shutter blade 4. The blade driving lever 6 is thus arranged to be able to turn on the shaft part 1c, and to cause the shutter blades 3 and 4 to turn on the shaft parts 1a and 1b of the shutter base plate 1, respectively, in association with the turning motion of the shutter driving lever 6.

The plunger 8 is mounted on a mounting shaft 1d of the shutter base plate 1 with a fore end part 9a of the plunger return spring 9 hooked on a hooking part 8a formed at the fore end 8b of the movable part of the plunger 8. The fore end 8b of the movable part of the plunger 8 is located below a driven engagement part 6c of the blade driving lever 6.

The hook attaching shaft 11 is rotatably press-fitted into a press-fitting hole 2a of the blade retaining base plate 2. The hook attaching part 11a of the hook attaching shaft 11 and the blade retaining base plate 2 are mounted to the shutter base plate 1 from the front side thereof and are fixed in place with the screws 12, 13 and 14.

In the last place, one of two end hooks of the tension coil spring 7, i.e., the lower hook, is attached to a hooking part 6d provided on the rear face of the blade driving lever 6. The other hook, i.e., the upper hook, of the tension coil spring 7 is attached to the hook attaching part 11a of the hook attaching shaft 11.

The operation of the shutter arranged as shown in FIGS. 1 and 2 is next described below with reference to FIGS. 3, 4 and 5.

Figure 3:
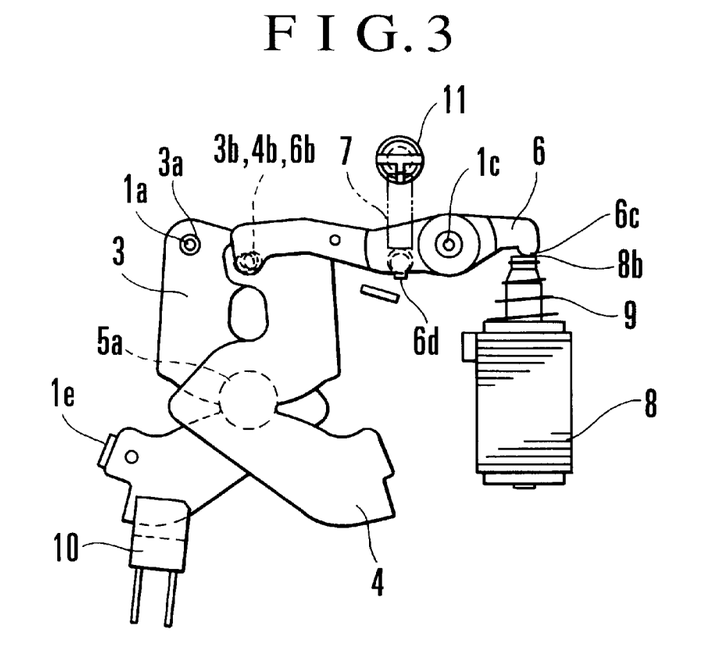
FIG. 3 schematically shows the shutter blades of the camera shutter of FIG. 1 in a closed state.
Figure 4:
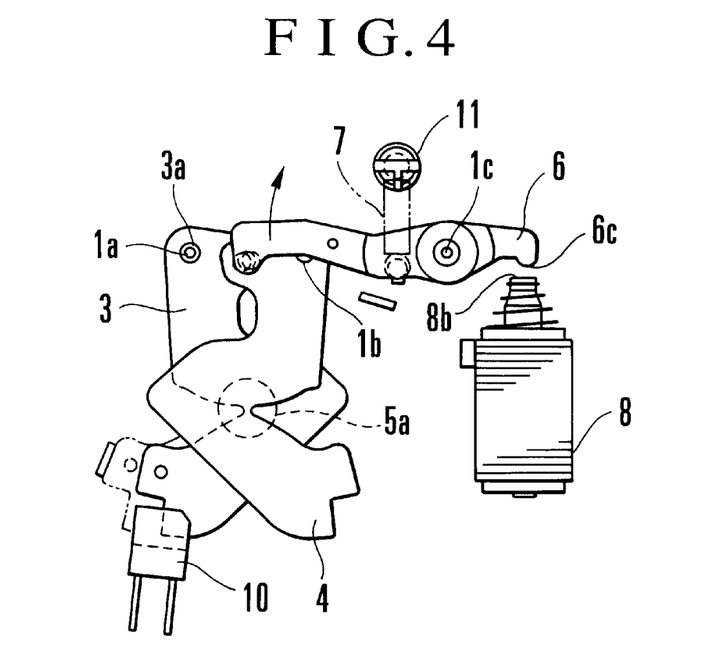
FIG. 4 schematically shows the shutter blades of the shutter of FIG. 1 in an initial stage of opening.
Figure 5:
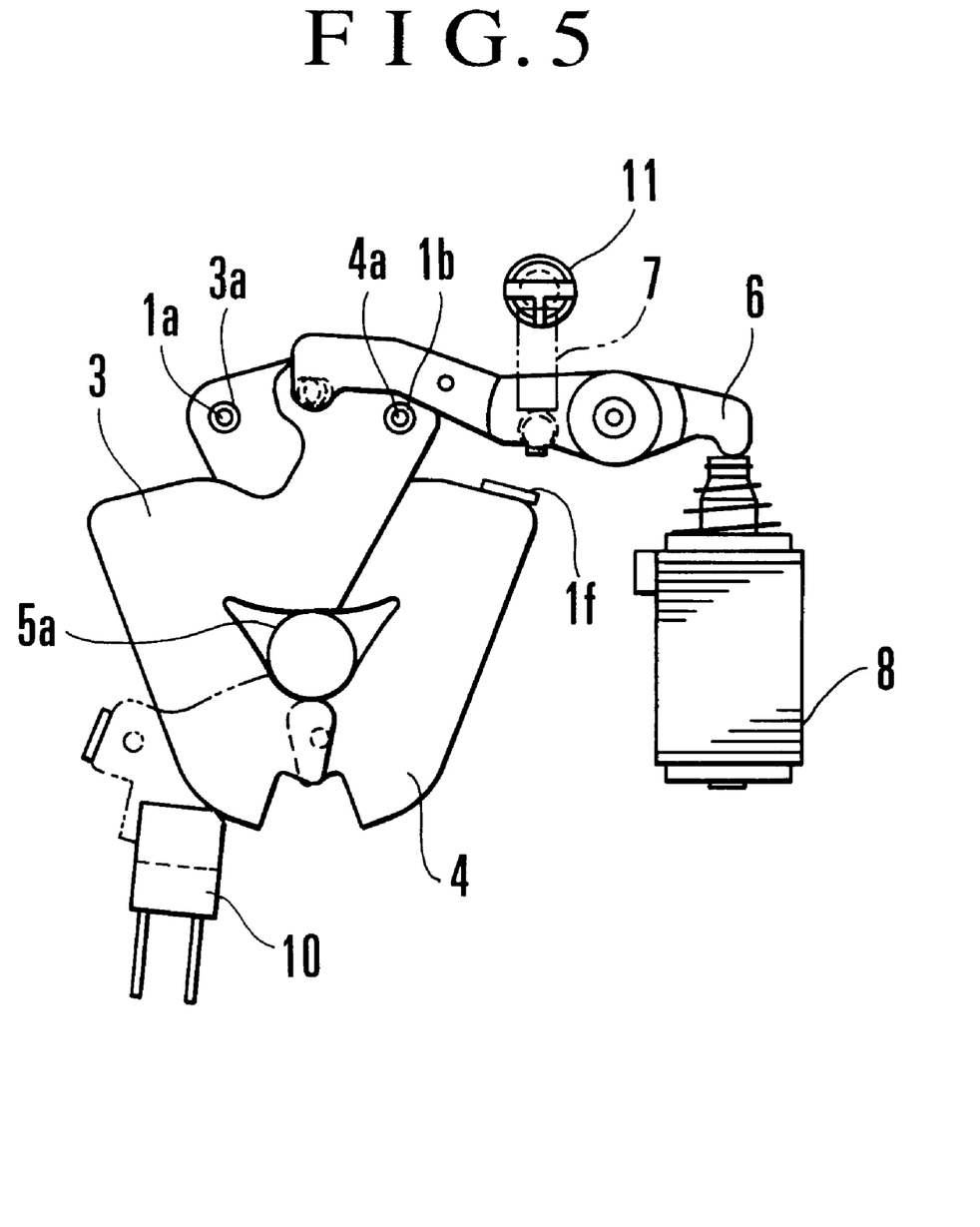
FIG. 5 schematically shows the shutter blades of the camera shutter of FIG. 1 in a fully open state.

FIGS. 3, 4 and 5 show in a simplified manner the shutter. The shutter blades 3 and 4 are shown as in a closed state in FIG. 3, as in an initial stage of opening in FIG. 4 and as in a full open state in FIG. 5.

Referring to FIG. 3, the driven engagement part 6c of the blade driving lever 6 is pushed by the fore end 8b of the movable part of the plunger 8, which is lifted up by the spring force of the plunger return spring 9, so that the blade driving lever 6 is turned counterclockwise on the shaft part 1c of the shutter base plate 1, as viewed in FIG. 3, against the spring force of the tension coil spring 7. Under this condition, the driving shaft 6b of the blade driving lever 6 which is fitted in the slots 3b and 4b of the shutter blades 3 and 4 causes the shutter blades 3 and 4 to be turned respectively on the shafts parts 1a and 1b in the direction of closing the shutter. The closing positions of the shutter blades 3 and 4 are defined by a shutter blade closing stopper 1e which is provided on the shutter base plate 1.

With the shutter in the state shown in FIG. 3, when the coil part of the plunger 8 is energized, the movable part of the plunger 8 is moved downward, as shown in FIG. 4, against the spring force of the plunger return spring 9, and is, then, held in the lower position by an attracting force of the plunger 8 (see FIG. 4).

Referring to FIG. 4, the driven engagement part 6c of the blade driving lever 6 is separated from the fore end 8b of the movable part of the plunger 8. Then, the blade driving lever 6 is caused by the restoring force of the tension coil spring 7 to turn clockwise on the shaft part 1c of the shutter base plate 1, as viewed in FIG. 4. With the blade driving lever 6 turned clockwise, the driving shaft 6b of the driving lever 6 fitted into the slots 3b and 4b of the shutter blades 3 and 4 causes the shutter blades 3 and 4 to turn respectively on the shaft parts 1a and 1b of the shutter base plate 1 in the direction of opening the shutter. The shutter blades 3 and 4 are shown in FIG. 4 in the initial stage of opening. The full open state of the shutter blades 3 and 4 are shown in FIG. 5. The full open positions of the shutter blades 3 and 4 are determined by a shutter blade closing stopper 1f which is provided on the shutter base plate 1.

In closing the shutter, a current applied to the coil of the plunger 8 is cut off. Then, the movable part of the plunger 8 is again lifted up by the spring force of the plunger return spring 9. The upward motion of the movable part of the plunger 8 causes the blade driving lever 6 to turn counterclockwise, as viewed in FIG. 5. The counterclockwise turn of the blade driving lever 6 causes the shutter blades 3 and 4 to turn in the closing direction, and the shutter comes back to the state shown in FIG. 3.

In the first embodiment, the hook attaching shaft 11 is formed, as described above, in such a shape that the axis of the hook attaching part 11a deviates from the center of the press-fitting hole 2a of the blade retaining base plate 2, which is coaxial with the axis of the hook attaching shaft 11. Therefore, when the hook attaching shaft 11 is caused to rotate on the center of the press-fitting hole 2a, the hook attaching part 11a is caused to rotate eccentrically with respect to the center of the press-fitting hole 2a.

Accordingly, the length of the tension coil spring 7 which is hooked on the hook attaching part 11a varies according to the rotation of the hook attaching shaft 11. The details of such an arrangement are described below with reference to FIGS. 6, 7 and 8.

Figure 6:
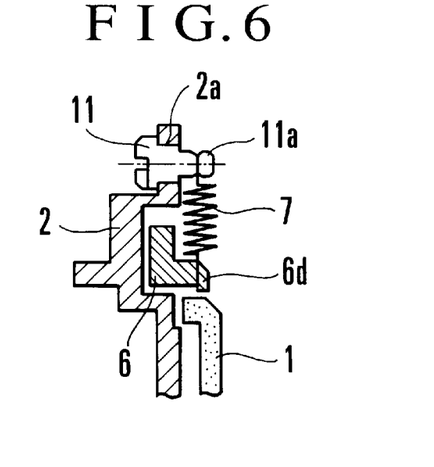
FIG. 6 is a longitudinal sectional view showing a tension coil spring of the camera shutter of FIG. 1 in a state of having its restoring force at an intermediate point.
Figure 7:
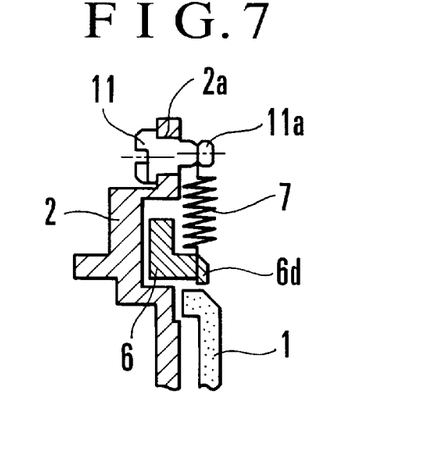
FIG. 7 is a longitudinal section view showing the tension coil spring of the camera shutter of FIG. 1 in a state of having its restoring force at a maximum point.
Figure 8:
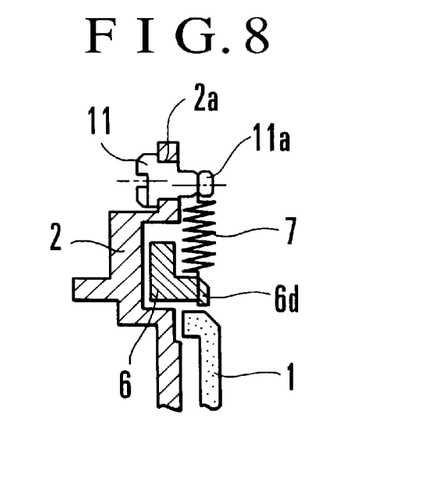
FIG. 8 is a longitudinal section view showing the tension coil spring of the camera shutter of FIG. 1 in a state of having its restoring force at a minimum point.

FIGS. 6, 7 and 8 are longitudinal sectional views showing the parts around the tension coil spring 7 of the shutter in the first embodiment.

The tension coil spring 7 is shown in a state of having the restoring force thereof at an intermediate point in FIG. 6, at a maximum point in FIG. 7, and at a minimum point in FIG. 8.

As apparent from FIGS. 7 and 8, the axis of the hook attaching part 11a of the hook attaching shaft 11 is eccentric with respect to the center of the press-fitting hole 2a of the blade retaining base plate 2. Therefore, as mentioned in the foregoing, when the hook attaching shaft 11 is caused to rotate, the hook attaching part 11a moves in such a direction as to vary the length of the tension coil spring 7. In other words, the restoring force of the tension coil spring 7 can be continuously and linearly changed by rotating the hook attaching shaft 11.

Again referring to FIG. 4, the opening speed of the shutter blades 3 and 4 depends on the speed of the turning movement of the blade driving lever 6. Also, the speed of the turning movement of the blade driving lever 6 depends on the restoring force of the tension coil spring 7. The restoring force of the tension coil spring 7, therefore, can be adjusted by rotating the hook attaching shaft 11. According to the arrangement of the first embodiment described above, therefore, the turning speed of the blade driving lever 6 can be varied and, eventually, the opening speed of the shutter blades 3 and 4 can be adjusted.

Second Embodiment

Figure 9:
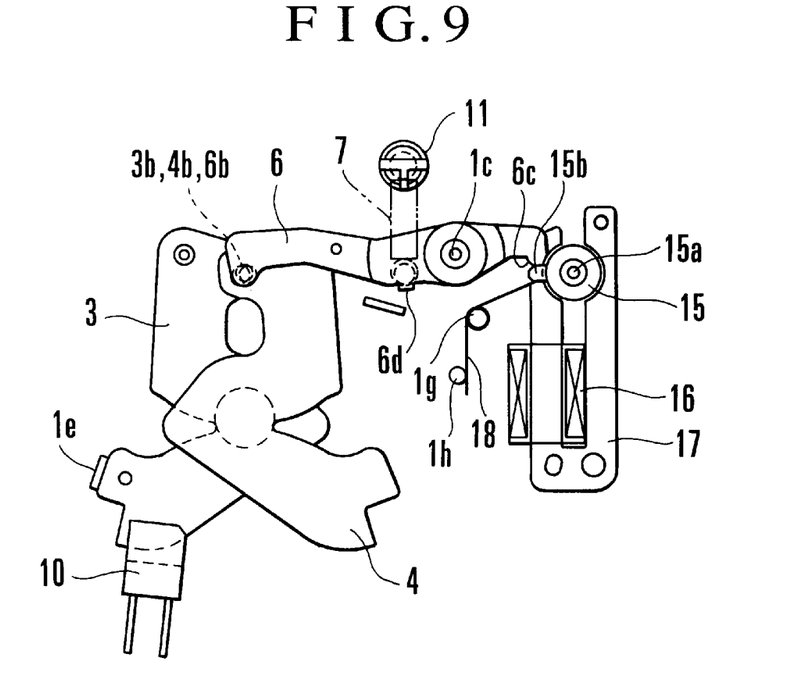
FIG. 9 schematically shows a camera shutter arranged as a second embodiment of the invention in a closed state.
Figure 10:
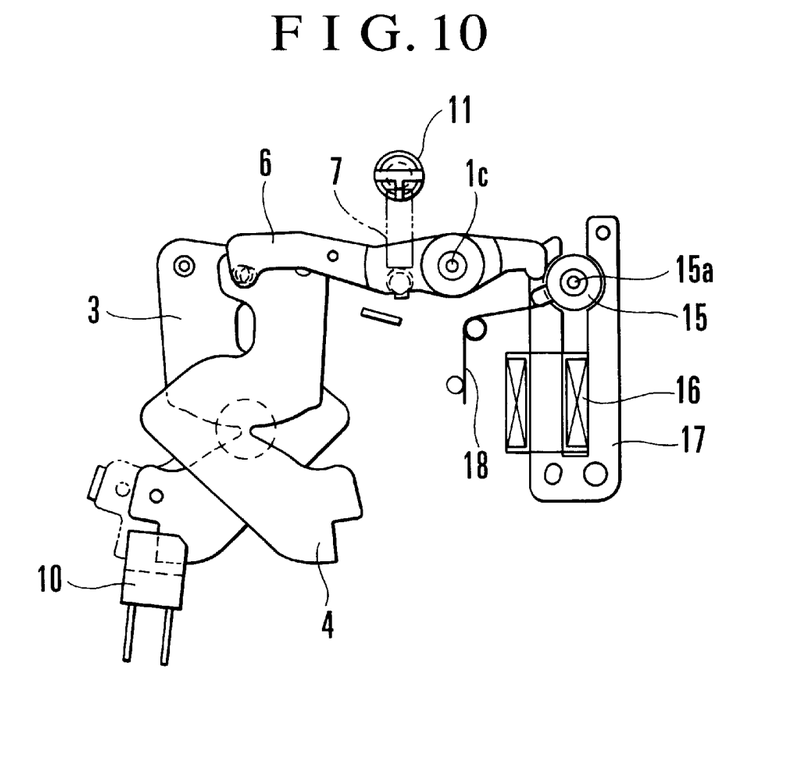
FIG. 10 schematically shows the shutter blades of the shutter of FIG. 9 in an initial stage of opening.
Figure 11:
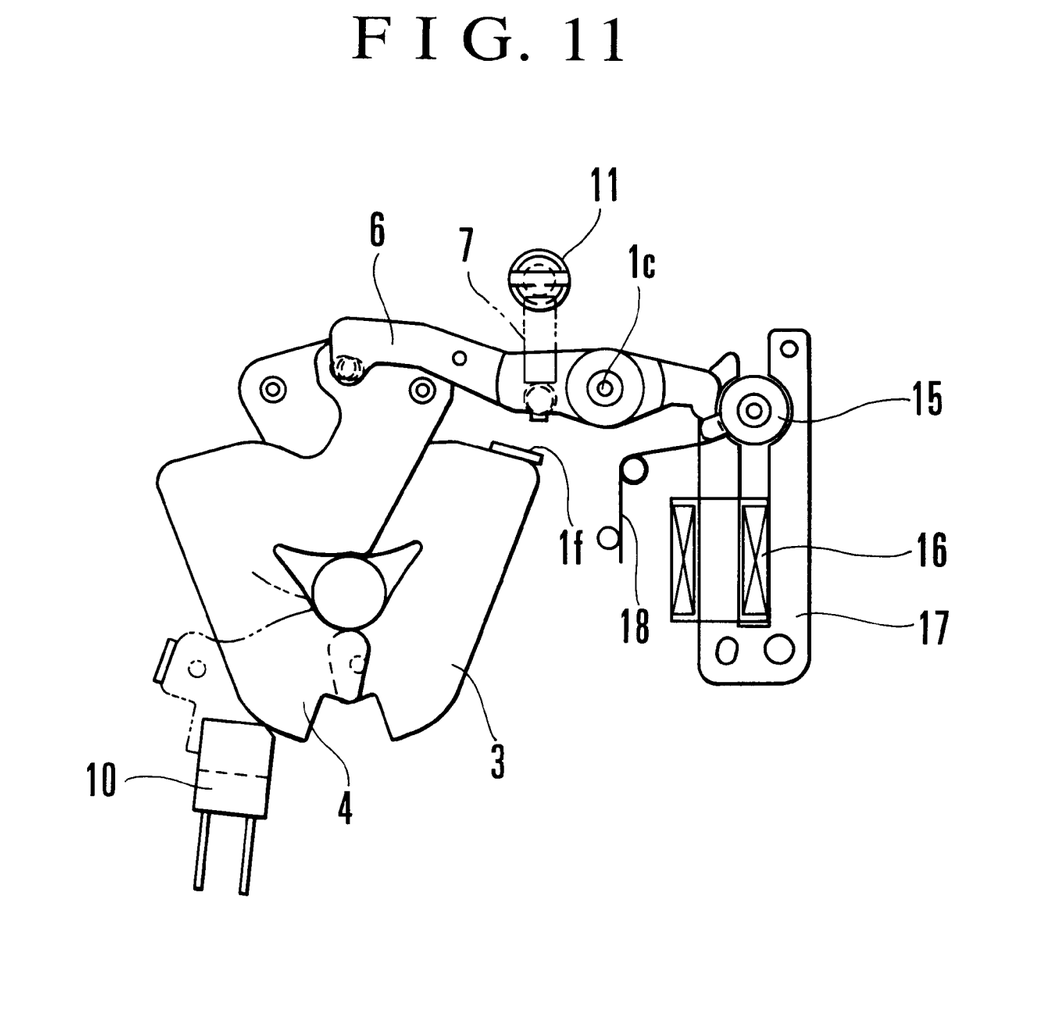
FIG. 11 schematically shows the shutter blades of the camera shutter of FIG. 9 in a full open state.

FIGS. 9, 10 and 11 show a shutter arranged as a second embodiment of the invention.

The shutter according to the second embodiment is the same as the first embodiment in fundamental arrangement but differs from the first embodiment in that an electromagnetic moving magnet is used as an electromagnetic actuator.

Referring to FIG. 9, there are illustrated a moving magnet 15, a coil 16, a yoke 17 and a moving magnet return spring 18.

The moving magnet 15 is mounted on the shutter base plate 1 so as to be rotatable on a rotating shaft 15a. The moving magnet 15 rotates on the rotating shaft 15a when the coil 16 is energized. The moving magnet 15 is provided with a turning projection 15b disposed below the driven engagement part 6c of the blade driving lever 6. The moving magnet return spring 18 is a torsion coil spring, the base part of which is attached to a shaft 1g which is provided on the shutter base plate 1. One end of the moving magnet return spring 18 which extends from the base part is hooked on a shaft 1h which is provided on the shutter base plate 1, while the other end thereof is hooked in such a position as to urge the turning projection 15b of the moving magnet 15 to turn clockwise as viewed in FIG. 9. Thus, the moving magnet return spring 18 is arranged to urge the moving magnet 15 to rotate on the rotating shaft 15a in the clockwise direction as viewed in FIG. 9.

The shutter blades 3 and 4 are shown in a closed state in FIG. 9, in an initial stage of opening in FIG. 10, and in a full open state in FIG. 11. With the exception of the operation in the electromagnetic actuator part, the second embodiment operates in the same manner as in the case of the first embodiment. Specifically, in the state shown in FIG. 9, the shutter blades 3 and 4 have been closed with the blade driving lever 6 caused to turn counterclockwise by the spring force of the moving magnet return spring 18 against the restoring force of the tension coil spring 7. When the coil 16 is energized in this state, the moving magnet 15a rotates on the rotating shaft 15a counterclockwise as viewed in FIG. 9 against the spring force of the moving magnet return spring 18. The rotation of the moving magnet 15 causes the turning projection 15b to part from the driven engagement part 6c, thereby allowing the blade driving lever 6 to be turned by the restoring force of the tension coil spring 7 on the shaft part 1c of the shutter base plate 1 in the clockwise direction as viewed FIG. 9. Then, the rotatable fitting-engagement of the driving shaft 6b of the blade driving lever 6 with the slots 3b and 4b of the shutter blades 3 and 4 causes the shutter blades 3 and 4 to begin to turn in the direction of opening the shutter, as shown in FIG. 10 until the shutter is full open as shown in FIG. 11.

The closing action of the shutter blades 3 and 4 is also fundamentally the same as in the case of the first embodiment. Specifically, when the coil 16 ceases to be energized, the spring force of the moving magnet return spring 18 causes the moving magnet 15 to rotate on the rotating shaft 15a in the clockwise direction as viewed in FIG. 11 against the restoring force of the tension coil spring 7. Then, the turning projection 15b of the moving magnet 15 acts on the driven engagement part 6c of the blade driving lever 6 to cause the blade driving lever 6 to turn counterclockwise on the shaft part 1c of the shutter base plate 1. As a result, the rotatable fitting-engagement of the driving shaft 6b with the slots 3b and 4b of the shutter blades 3 and 4 causes the shutter blades 3 and 4 to turn in the direction of closing the shutter, as shown in FIG. 9.

Referring again to FIG. 9, the hook attaching part 11a of the hook attaching shaft 11 is an eccentric shaft as mentioned above. Accordingly, the hook attaching part 11a moves in such a direction as to vary the length of the tension coil spring 7 when the hook attaching shaft 11 is rotated. The restoring force of the tension coil spring 7 can be adjusted by rotating the hook attaching shaft 11. Therefore, the opening speed of the shutter blades 3 and 4 can be eventually adjusted.

Third Embodiment

A shutter arranged as a third embodiment of the invention is next described below with reference to FIGS. 2, 12 and 13.

In the first embodiment shown in FIG. 2, the hook attaching shaft 11 is press-fitted into the blade retaining base plate 2 from the front side of the camera. In the case of the third embodiment, on the other hand, the hook attaching part 11a is disposed on the rear side of the camera as shown in FIGS. 12 and 13.

Figure 12:
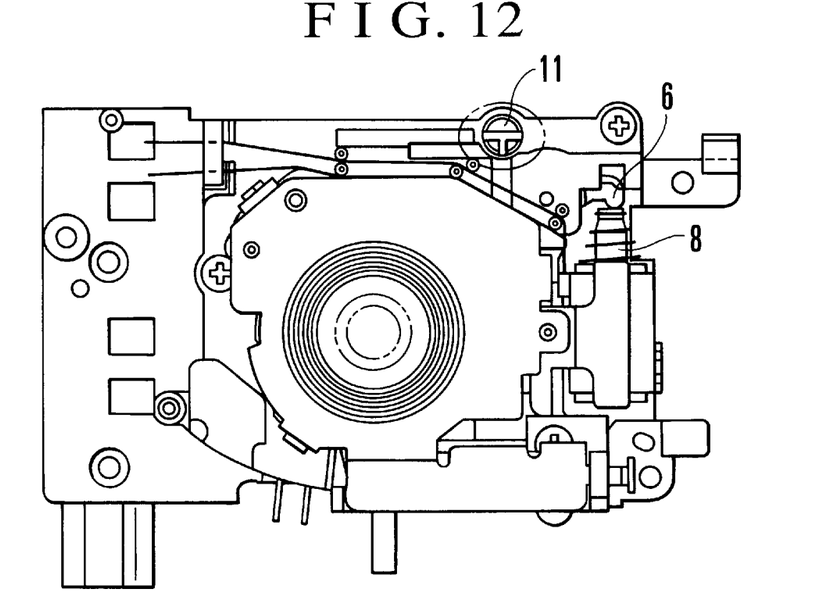
FIG. 12 is a front view of a camera arranged as a third embodiment of the invention.
Figure 13:
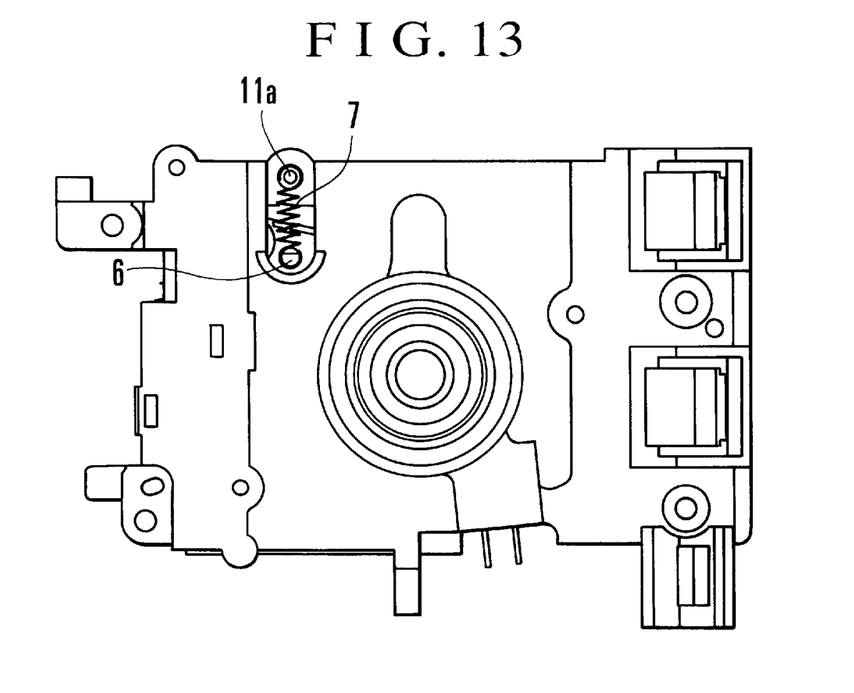
FIG. 13 is a rear view of the camera of FIG. 12.

FIG. 12 is a front view showing the shutter as viewed from the front side of the camera. FIG. 13 is a rear view showing the shutter as viewed from the rear side of the camera.

A feature of the third embodiment lies in that the hook attaching part 11a is disposed on the rear side of the camera. With the exception of this point, the third embodiment is arranged in the same manner as in the case of the first embodiment.

With the shutter arranged in this manner, the tension coil spring 7 can be mounted from the rear side of the camera. The hook attaching shaft 11 is provided with a groove in one side thereof located on the front side of the camera. The groove permits the hook attaching shaft 11 to be rotated with a tool such as a screw driver. Therefore, the restoring force of the tension coil spring 7 can be adjusted by rotating the hook attaching shaft 11 with a tool such as a screw driver from the front side, i.e., from the front side of an optical axis, of the camera.

Fourth Embodiment

Figure 14:
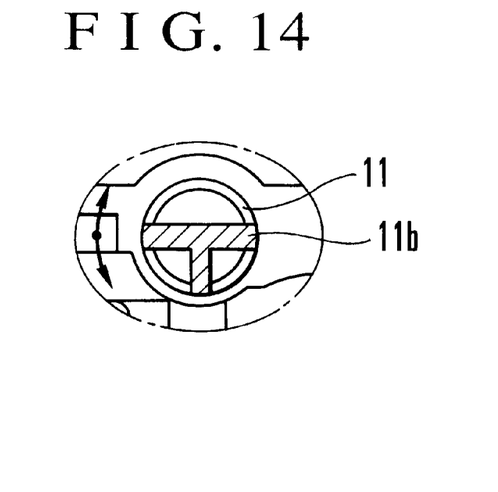
FIG. 14 is an enlarged front view showing a hook mount shaft in a fourth embodiment of the invention in a state of having the restoring force of a tension coil spring at an intermediate point.
Figure 15:
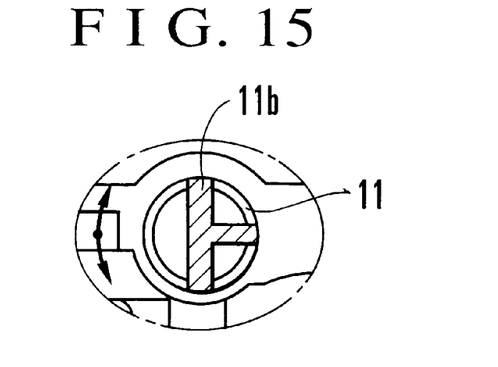
FIG. 15 is an enlarged front view showing the hook mount shaft of FIG. 14 in a state of having a maximum restoring force of the tension coil spring.
Figure 16:
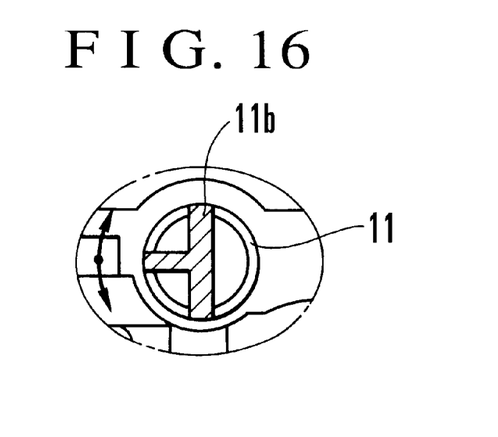
FIG. 16 is an enlarged front view showing the hook mount shaft of FIG. 14 in a state of having a minimum restoring force of the tension coil spring.

FIGS. 14, 15 and 16 relate to a shutter arranged as a fourth embodiment of the invention. The fourth embodiment is arranged in the same manner as the first embodiment, except in the following point.

Referring to FIGS. 14, 15 and 16, a T-shaped groove 11b is formed in the head of the hook attaching shaft 11. The T-shaped groove 11b is arranged to indicate an eccentric phase of the hook attaching part 11a. More specifically, the hook attaching shaft 11 is shown in a state of indicating that the tension coil spring 7 is in its middle (center) length position in FIG. 14, in a rotated state of indicating that the tension coil spring 7 is in its shortest length position in FIG. 15, and in a rotated state of indicating that the tension coil spring 7 is in its longest length position in FIG. 16.

The arrangement of the fourth embodiment makes the adjusted position of the restoring force of the tension coil spring 7 visible through the position of the T-shaped groove 11b provided in the hook attaching shaft 11. In adjusting the restoring force of the tension coil spring 7, the arrangement of the fourth embodiment not only facilitates adjustment work on the shutter but also permits adjustment work to be accurately carried out as the adjusting positions are clearly visible.

I claim:

1. A shutter device comprising:
   a) a base member;
   b) a plurality of shutter blades supported by said base member and each arranged to turn in opposite directions;
   c) a shutter blade driving lever having an engaging part which engages said plurality of shutter blades and arranged to turn so as to cause each of said shutter blades to turn toward and away from each other;
   d) an eccentric pin which is rotatable; and
   e) a spring having one end thereof connected to said shutter blade driving lever and the other end thereof connected to said eccentric pin, and arranged to drive said plurality of shutter blades by urging said shutter blade driving lever in one direction,
   wherein an urging force of said spring is adjustable by rotating said eccentric pin, said urging force being continuously and linearly adjustable throughout rotation of said eccentric pin.

2. A shutter device according to claim 1, further comprising a cover member arranged to cover said plurality of shutter blades by being fixed to said base member, and wherein said eccentric pin is arranged to be rotatable with said cover member fixed to said base member.

3. A shutter device according to claim 1, wherein said eccentric pin is provided with a visible mark which makes an amount of rotation of said eccentric pin visible.

4. A shutter device according to claim 1, wherein said shutter blade driving lever is urged by said spring in such a direction as to open said plurality of shutter blades.

5. A shutter device according to claim 1, further comprising an electromagnetic driving device which arrests said shutter blade driving lever when not being energized and which cancels arrest of said shutter blade driving lever when being energized, and wherein said shutter blade driving lever is moved by the urging force of said spring when the arrest of said shutter blade driving lever is canceled by said electromagnetic driving device.

6. A shutter device according to claim 1, wherein said eccentric pin is provided on said cover member in a rotatable state.

7. A shutter device according to claim 1, wherein said spring is a coil spring.

8. A shutter device according to claim 5, wherein said shutter blade driving lever has an engaging part formed at one end thereof to engage said plurality of shutter blades and an abutting part formed at the other end thereof to abut on said electromagnetic driving device, and the center of turn of said shutter blade driving lever is located between said engaging part and said abutting part.

9. A shutter device comprising:
   a) a base member;
   b) a plurality of shutter blades supported by said base member and each arranged to turn in opposite directions;
   c) a shutter blade driving lever having an engaging part which engages said plurality of shutter blades and arranged to turn so as to cause each of said shutter blades to turn toward and away from each other;
   d) a spring arranged to drive said plurality of shutter blades by urging said shutter blade driving lever in a predetermined direction; and
   e) an adjustment mechanism which enables continuous and linear adjustment of an urging force of said spring throughout a range of urging forces.

10. A shutter device according to claim 9, wherein said adjustment mechanism includes a rotatable eccentric pin, and the continuous adjustment of the urging force of said spring is effected by rotating said pin.

11. A shutter device according to claim 10, wherein said eccentric pin is able to be rotated from a front side of an optical axis.

12. A shutter device according to claim 10, wherein said eccentric pin is provided with a visible mark which makes an amount of rotation of said eccentric pin visible.

13. A shutter device according to claim 9, further comprising an electromagnetic driving device which arrests said shutter blade driving lever against the urging force of said spring when not being energized, and wherein said shutter blade driving lever is turned by the urging force of said spring when said electromagnetic driving device is energized.

14. A camera having a shutter device comprising:
   a) a base member;
   b) a plurality of shutter blades supported by said base member and each arranged to turn in opposite directions;
   c) a shutter blade driving lever having an engaging part which engages said plurality of shutter blades and arranged to turn so as to cause each of said shutter blades to turn toward and away from each other;
   d) an eccentric pin which is rotatable; and
   e) a spring having one end thereof connected to said shutter blade driving lever and the other end thereof connected to said eccentric pin, and arranged to drive said plurality of shutter blades by urging said shutter blade driving lever in one direction,
   wherein an urging force of said spring is adjustable by rotating said eccentric pin, said urging force being continuously and linearly adjustable throughout rotation of said eccentric pin.

15. A camera according to claim 14, further comprising a cover member arranged to cover said plurality of shutter blades by being fixed to said base member, and wherein said eccentric pin is arranged to be rotatable with said cover member fixed to said base member.

16. A camera according to claim 14, wherein said eccentric pin is provided with a visible mark which makes an amount of rotation of said eccentric pin visible.

17. A camera according to claim 14, further comprising an electromagnetic driving device which arrests said shutter blade driving lever when not being energized and which cancels arrest of said shutter blade driving lever when being energized, and wherein said shutter blade driving lever is moved by the urging force of said spring when the arrest of said shutter blade driving lever is canceled by said electromagnetic driving device.

18. A camera according to claim 17, wherein said shutter blade driving lever has an engaging part formed at one end thereof to engage said plurality of shutter blades and an abutting part formed at the other end thereof to abut on said electromagnetic driving device, and the center of turn of said shutter blade driving lever is located between said engaging part and said abutting part.

19. A camera according to claim 14, wherein said eccentric pin is able to be rotated from a front side of said camera.

20. A camera having a shutter device comprising:

a) a base member;

b) a plurality of shutter blades supported by said base member and each arranged to turn in opposite directions;

c) a shutter blade driving lever having an engaging part which engages said plurality of shutter blades and arranged to turn so as to cause each of said shutter blades to turn toward and away from each other;

d) a spring arranged to drive said plurality of shutter blades by urging said shutter blade driving lever in a predetermined direction; and e) an adjustment mechanism which enables continuous and linear adjustment of an urging force of said spring throughout a range of urging forces.

21. A camera according to claim 20, wherein said adjustment mechanism includes a rotatable eccentric pin, and the continuous adjustment of the urging force of said spring is effected by rotating said pin.

22. A camera according to claim 21, wherein said eccentric pin is able to be rotated from a front side of said camera.

23. A camera according to claim 21, wherein said eccentric pin is provided with a visible mark which makes an amount of rotation of said eccentric pin visible.

\* \* \* \* \*